US006877159B1

(12) United States Patent
Nielsen et al.

(10) Patent No.: US 6,877,159 B1
(45) Date of Patent: Apr. 5, 2005

(54) APPARATUS AND METHOD FOR MAINTAINING OBJECT ASSOCIATIONS IN AN OBJECT ORIENTED ENVIRONMENT

(75) Inventors: Mark David Nielsen, Houston, TX (US); Michael Albert Perks, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 806 days.

(21) Appl. No.: 09/627,177

(22) Filed: Jul. 27, 2000

(51) Int. Cl.[7] ................................................ G06F 9/46
(52) U.S. Cl. .................... 718/104; 718/100; 718/102; 718/103; 718/105
(58) Field of Search ................................ 718/100, 102, 718/104, 103, 105; 709/100, 101, 102, 103

(56) References Cited

U.S. PATENT DOCUMENTS

| 5,249,265 A | 9/1993 | Liang .......................... 395/160 |
| 5,297,283 A | 3/1994 | Kelly, Jr. et al. ............ 395/650 |
| 5,511,196 A | * 4/1996 | Shackelford et al. ........ 709/315 |
| 5,551,029 A | 8/1996 | Jagadish et al. ............. 395/600 |
| 5,579,318 A | * 11/1996 | Reuss et al. ................. 370/410 |
| 5,583,983 A | * 12/1996 | Schmitter .................... 717/138 |
| 5,794,030 A | * 8/1998 | Morsi et al. ............. 707/103 R |
| 5,872,973 A | 2/1999 | Mitchell et al. ............. 395/685 |
| 5,991,534 A | 11/1999 | Hamilton et al. ............ 395/701 |
| 5,995,980 A | * 11/1999 | Olson et al. ................. 707/201 |
| 6,020,895 A | 2/2000 | Azami ......................... 345/433 |

OTHER PUBLICATIONS

Method to Dynamically Alter Application Message Handling; International Business Machines Technical Disclosure Bulletin; vol. 36, No. 04, Apr. 1993; p. 331.

* cited by examiner

Primary Examiner—Meng-Al T. An
Assistant Examiner—Nilesh Shan
(74) Attorney, Agent, or Firm—Duke W. Yee; David A. Mims, Jr.; Francis Lammes

(57) ABSTRACT

An apparatus and method for maintaining object associations in an object oriented environment is provided. The apparatus and method make use of value holders to enable a single method to perform the creation and/or update of object associations for all combinations of possible object associations including one to one associations, one to many associations, many to one and many to many associations.

26 Claims, 6 Drawing Sheets

APPARATUS AND METHOD FOR MAINTAINING OBJECT ASSOCIATIONS IN AN OBJECT ORIENTED ENVIRONMENT

BACKGROUND OF THE INVENTION

1. Technical Field

The present invention is directed to an apparatus and method for maintaining object associations in an object oriented environment. In particular, the present invention is directed to an apparatus and method for maintaining object associations at both ends of the association with a minimal amount of code required.

2. Description of Related Art

In object oriented design, two classes can be related using an association which has cardinalities on each end. For example, an Employee has an address and a single Employee (cardinality 1) has one or more Addresses (cardinality 1 . . . n). Typically, the Employee object keeps a list of addresses in a collection class, such as a Java vector. It is also possible that the Address object may keep a reference to the Employee that owns it.

It can be seen that there are four possible combinations of object association cardinalities: one to one; one to many; many to one, and many to many. In order to handle all of these possible object associations, the amount of code necessary to perform each association and update each association may become extremely large and unmaintainable. Thus, it would be beneficial to have an apparatus and method for maintaining object associations in an object oriented environment in which the amount of code necessary to handle each possible combination of object association cardinalities is minimized.

SUMMARY OF THE INVENTION

The present invention provides an apparatus and method for maintaining object associations in an object oriented environment. The apparatus and method of the present invention makes use of value holders to enable a single method to perform the creation, update and deletion of object associations for all combinations of possible object associations including one to one associations, one to many associations, many to one and many to many associations. Because two common methods are used to perform the creation, updating and deletion of all object associations, the amount of code necessary to handle each possible combination of object association cardinalities is minimized.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
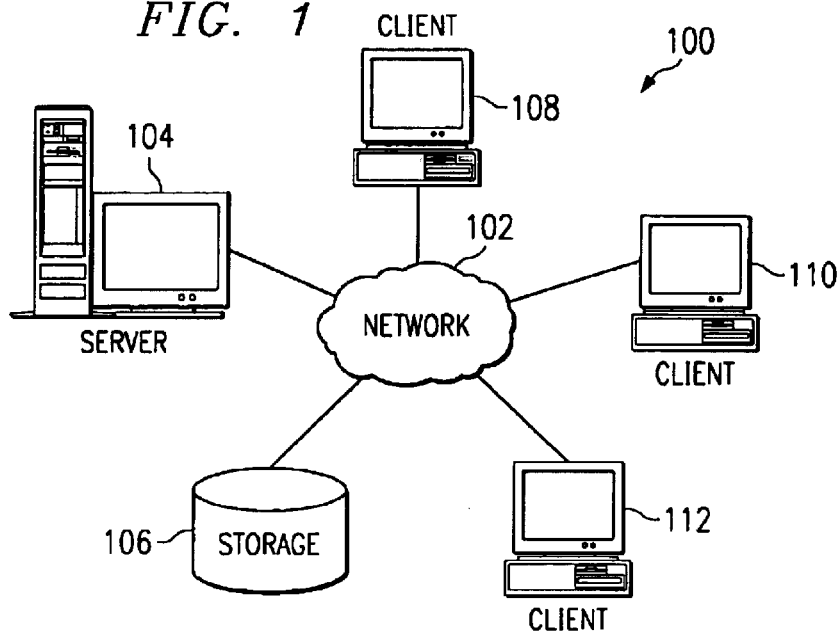
FIG. 1 is an exemplary block diagram of a distributed data processing system according to the present invention.

With reference now to the figures, and in particular with reference to FIG. 1, a pictorial representation of a distributed data processing system in which the present invention may be implemented is depicted. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as, for example, an Intranet or a local area network.

FIG. 1 is intended as an example, and not as an architectural limitation for the processes of the present invention. The present invention may be implemented in the depicted distributed data processing system or modifications thereof as will be readily apparent to those of ordinary skill in the art.

Figure 2A:
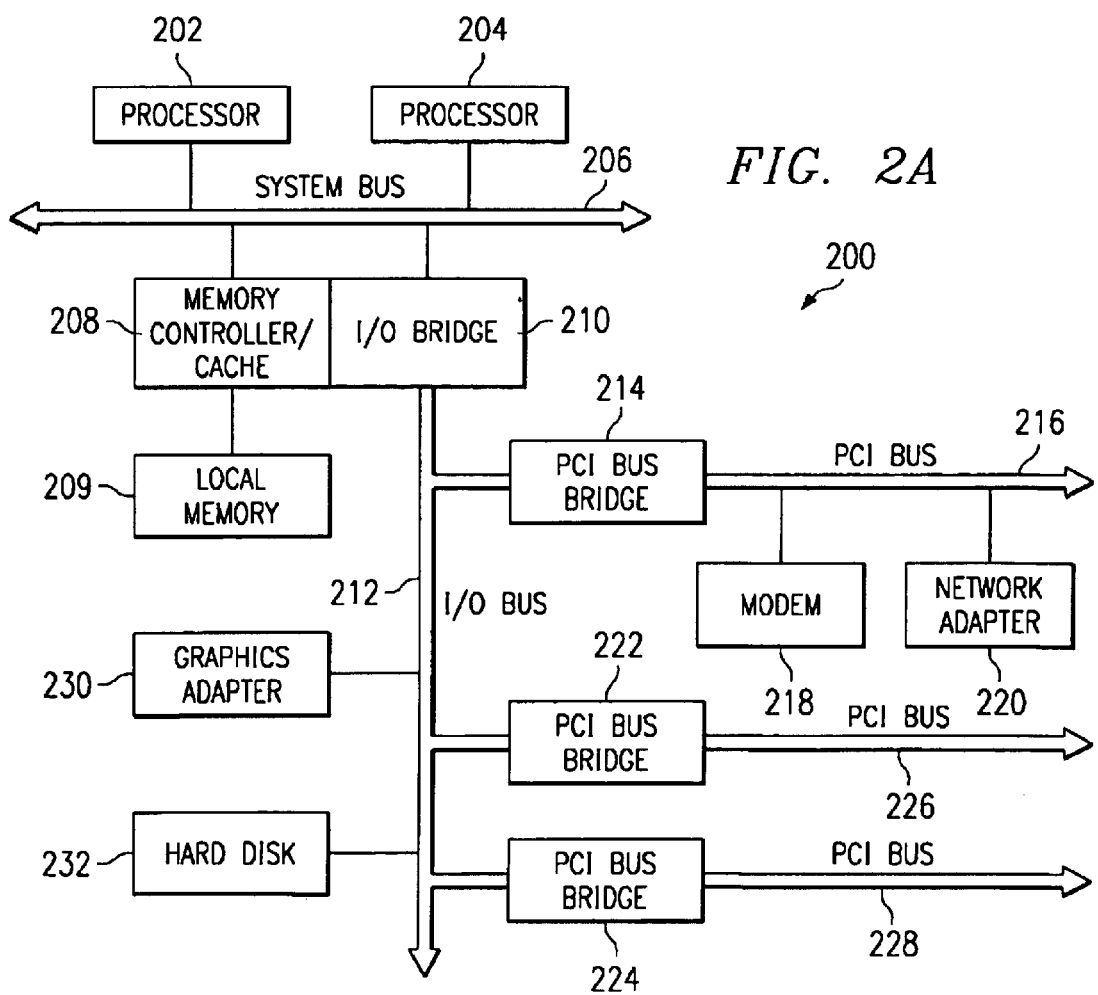
FIG. 2A is an exemplary block diagram of a data processing system according to the present invention.

With reference now to FIG. 2A, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209.

I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A modem 218 may be connected to PCI local bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2A may vary. For example, other peripheral devices, such as optical disk drive and the like also may be used in addition or in place of the hardware depicted. The depicted example is not meant to imply architectural limitations with respect to the present invention.

The data processing system depicted in FIG. 2A may be, for example, an IBM RISC/System 6000 system, a product of International Business Machines Corporation in Armonk, N.Y., running the Advanced Interactive Executive (AIX) operating system.

Figure 2B:
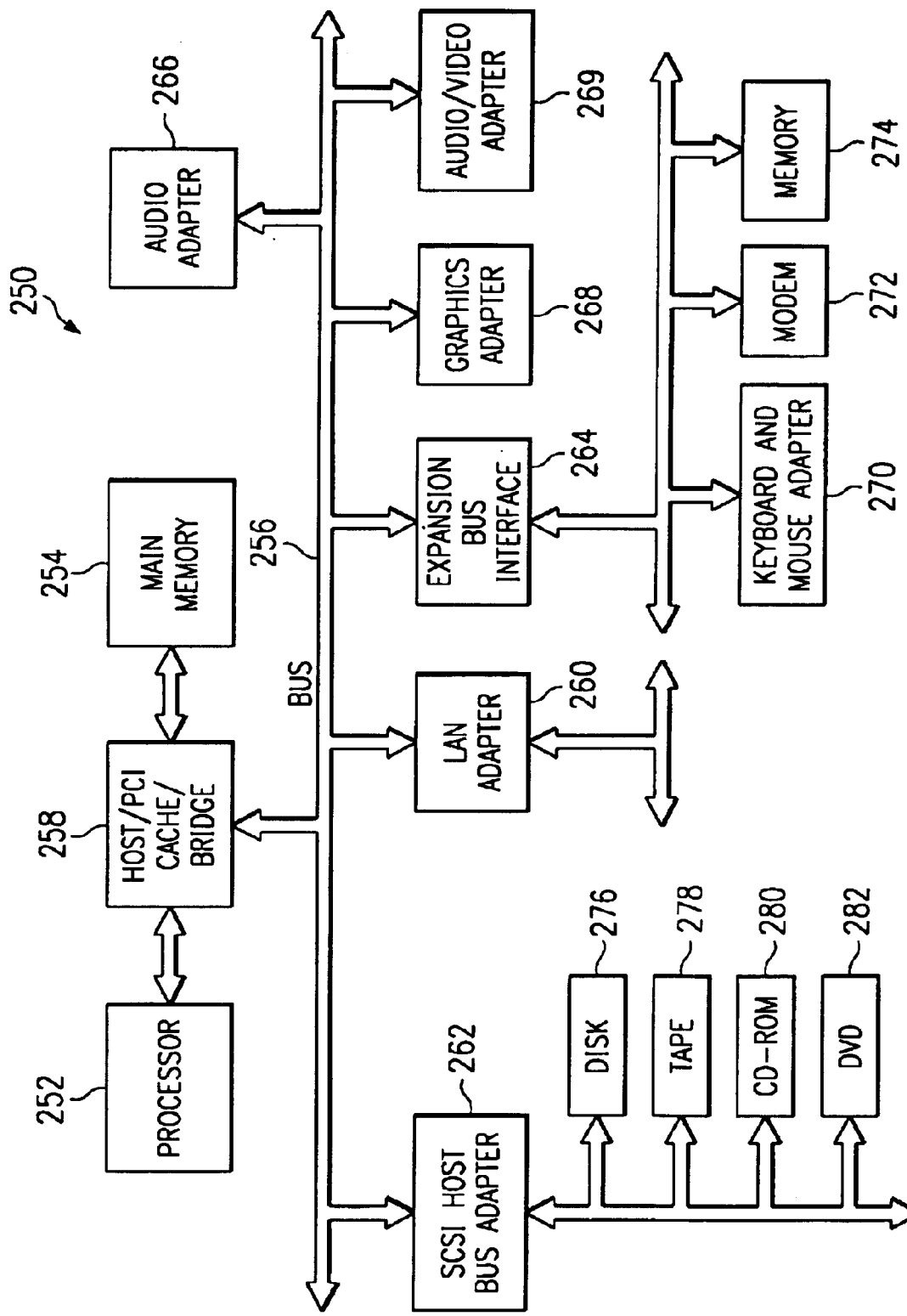
FIG. 2B is an exemplary block diagram of a data processing system according to the present invention.

With reference now to FIG. 2B, a block diagram of a data processing system in which the present invention may be implemented is illustrated. Data processing system 250 is an example of a client computer. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards. In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 264 provides a connection for a keyboard and mouse A adapter 270, modem 272, and additional memory 274. SCSI host bus adapter 262 provides a connection for hard disk drive 276, tape drive 278, and CD-ROM 280 in the depicted example. Typical PCI local bus implementations will support three or four PCI expansion slots or add-in connectors.

An operating system runs on processor 252 and is used to coordinate and provide control of various components within data processing system 250 in FIG. 2B. The operating system may be a commercially available operating system such as Microsoft Windows NT available from Microsoft Corporation, AIX, OS/2, or the like, which are available from International Business Machines Corporation.

An object oriented programming system such as Java may run in conjunction with the operating system and may provide calls to the operating system from Java programs or applications executing on data processing system 250. Instructions for the operating system, the object-oriented operating system, and applications or programs are located on storage devices, such as hard disk drive 276 and may be loaded into main memory 254 for execution by processor 252. Hard disk drives are often absent and memory is constrained when data processing system 250 is used as a network client.

Those of ordinary skill in the art will appreciate that the hardware in FIG. 2B may vary depending on the implementation. For example, other peripheral devices, such as optical disk drives and the like may be used in addition to or in place of the hardware depicted in FIG. 2B. The depicted example is not meant to imply architectural limitations with respect to the present invention. For example, the processes of the present invention may be applied to a multiprocessor data processing system.

The present invention provides an apparatus and method for maintaining object associations in an object oriented environment. The present invention may operate on a variety of computer platforms and object oriented languages such as a Java, Smalltalk, C++ or Eiffel, and the like. For example, the present invention may operate in conjunction with a Java virtual machine (JVM) yet within the boundaries of a JVM as defined by Java standard specifications.

The present invention provides a mechanism by which object associations are maintained and modified. The present invention is capable of handling all four combinations of object association cardinalities, one to one, one to many, many to one and many to many, with a minimal amount of code to perform the object associations. In the following description, example code is provided in the Java programming language. As discussed above, Java is but one exemplary embodiment of the present invention and other programming languages may be used without departing from the spirit and scope of the present invention. Those of ordinary skill in the art may readily determine how to convert the provided examples to their object oriented programming language of choice such as C++, Smalltalk or Eiffel.

Figure 3A:
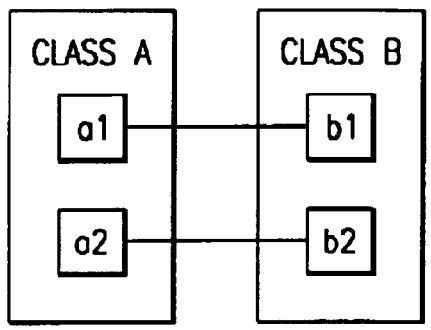
FIGS. 3A and 3B are block diagrams illustrating an association change in a one to many object association.
Figure 3B:
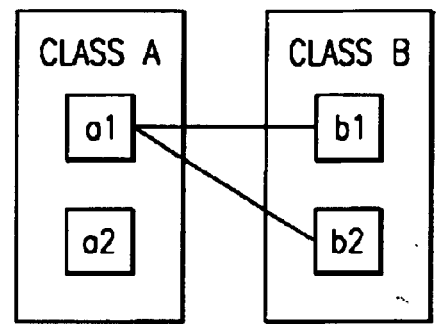

FIGS. 3A and 3B are exemplary block diagrams illustrating an update of an object association from a one to one object association to a one to many object association. As shown in FIGS. 3A and 3B, a class A has a one-to-any association with class B. That is, an instance of class A can contain 0, 1 or many references to different instances of class B. A particular instance of class B contains at most one reference to an instance of class A. The multiple instances of class B that class A can reference are stored in a collection. For the description and examples shown below, vector will be used for the collection. Those of ordinary skill in the art may use any collection representation providing that object uniqueness is maintained.

Assume that a1 and a2 are instances of class A and b1 and b2 are instances of class B. As shown in FIG. 3A, suppose a1 contains a reference to one instance of class B (b1). Suppose also that another instance of class B (b2) references an instance of class A (a2).

Suppose now that it is required that the instance b2 is to be associated with the instance a1 as shown in FIG. 3B. In order to perform this operation, three steps must be executed. These steps include:

1) removing b2 from the collection in a2;
2) adding b2 to the collection in a1; and
3) setting the reference to class A in b2 to a1.

In order to perform these three steps, various methods may be employed. In the present invention, the following methods exist on class A to aid in performing these three steps:

1) public vector getB( )—returns the vector of B instances;
2) public void addB(B element)—adds an instance of B to the vector;
3) public boolean removeB(B element)—removes an instance of B from the vector; and
4) public void setB(Vector v)—stores a new vector.

In addition to the methods for class A, the following methods exist on class B:

1) public A getA( )—returns a reference to A; and
2) public void setA(A element)—sets the reference to A and overwrites the previous reference value for A.

The Java code to implement the operation of updating the one to one object association to a one to many object association is as follows:

1) a2.getB( ).removeElement(b2);
2) a1.getB( ).addElement(b2); and
3) b2.setA(a1).

A many-to-one object association an be implemented in the same manner as the one to many object association described above with regard to FIGS. 3A and 3B.

Figure 4A:
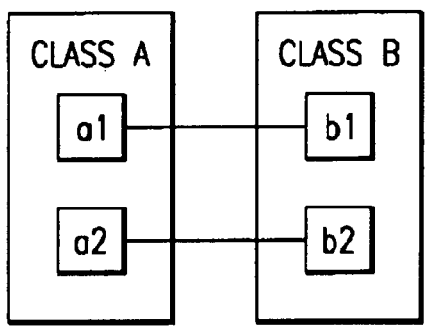
FIGS. 4A and 4B are block diagrams illustrating an association change in a one to one object association.
Figure 4B:
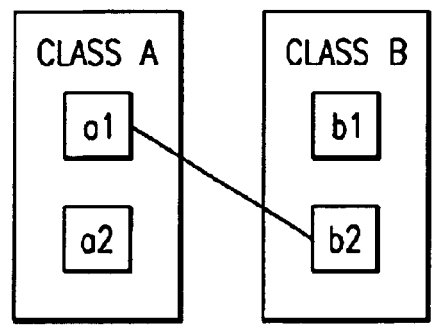

Now assume that a one to one object association is to be changed to a different one to one object association, as shown in FIGS. 4A and 4B. For example, assume that, from the associations shown in FIG. 4A, it is required that b2 reference a1 instead of a2, as shown in FIG. 4B. In order to perform this operation, the following steps must be executed:

1) set the reference to A in b1 to null;
2) set the reference to class B in a1 to b2;
3) set the reference to class A in b2 to a1; and
4) set the reference to B in a2 to null.

Figure 5A:
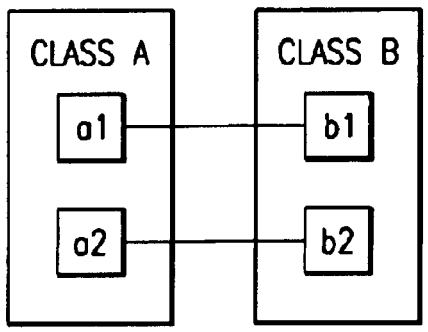
FIGS. 5A and 5B are block diagrams illustrating a change from a one to one object association to a many to many object association.
Figure 5B:
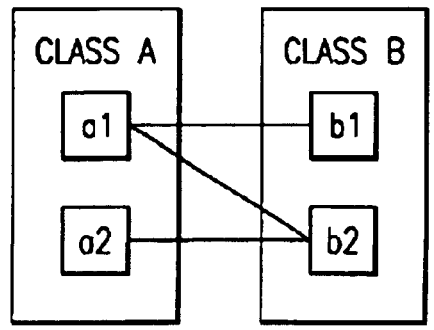

For the object association in which many objects in class A are associated to many objects in class B, it is more difficult to ascertain if references to objects should be removed or maintained. For example, suppose a1 contains a reference to an instance of class B (b1), as shown in FIG. 5A. Suppose also that another instance of class B (b2) contains a reference to one instance of class A (a2). Now suppose that it is required that the instance b2 reference a1 as shown in FIG. 5B.

In order to perform this operation, two steps need to be executed:

1) add b2 to the collection in a1; and
2) add a1 to the collection in b2.

Thus, it can be seen from the examples provided above that, depending on the particular situation, various steps must be executed in order to perform the necessary functions to establish object associations. This may require the generation of separate code to handle each of the possible combinations of object associations. In order to simplify the methods in the classes for performing the various necessary functions, the present invention makes use of value holders.

A value holder is simply an object that wrappers another object to perform some other function, i.e. the value holder implements a proxy pattern as described in "Design Patterns" by Gamma, Helm, Johnson and Vlissides. The value holders of the present invention are used to ease the implementation of a single method that maintains the object instance associations.

With the present invention, the following value holder methods are added to class A:

1) public ValueHolderInterface getBHolder( )—returns reference to B's value holder; and
2) public void setBHolder (ValueHolderInterface holder)—sets B's value holder.

The following value holder methods are added to class B:

1) public ValueHolderInterface getAHolder( )—returns reference to A's value holder; and
2) public void setBHolder (ValueHolderInterface holder)—sets A's value holder.

The ValueHolderInterface can be implemented as a Java interface that specifies the holder methods:

1) public Object getValue( )—returns the object wrapped by the value holder; and
2) public void setValue(Object value)—sets the object to be wrapped by this value holder.

With the use of the ValueHolderInterface and the value holder methods above, the present invention is capable of making use of a single method in common code that can handle all cases of creating and updating an object association. The method (referred to as addAssociation) according to the present invention needs eight parameters of which first and third are optional:

1) oldSourceHolder—the value holder that the old source currently points to;
2) oldTargetHolder—the value holder that the old target currently points to;
3) sourceHolder—the value holder that the source currently points to;
4) targetHolder—the value holder that the target currently points to;
5) source—the source object instance;
6) target—the target object instance;
7) sourceCardinality—false if the cardinality of the source is 1, true if it is many; and
8) targetCardinality—false if the cardinality of the target is 1, true if it is many.

In the case of a one to one object association, for example, the above eight parameters would have the following values:

1) oldSourceHolder=b1 value holder;
2) oldTargetHolder=a2 value holder;
3) sourceHolder=b2 value holder;
4) targetHolder=a1 value holder;
5) source=b2;
6) target=a1;
7) sourceCardinality=false; and
8) targetCardinality=false.

Taking the eight parameters described above, a single method may be used to perform creation and updates of each of the four combinations of object associations described above. As an example, if a one to one object association is to be created or updated, the implementation of the method is as follows:

1) oldSourceHolder.setValue(null)—sets the reference to A in b1 to null;
2) targetHolder.setValue(b2)—sets the reference to class B in a1 to b2;
3) sourceHolder.setValue(a1)—sets the reference to class A in b2 to a1; and
4) oldTargetHolder.setValue(null)—sets the referent to B in a2 to null.

The generalized method has up to four basic steps and each step has two variations depending on the cardinality of the object. The steps are to update the old source, update the target, update the source, and update the old target. Table 1 summarizes which steps are used to perform creation and updates of each of the four combinations of object associations. The symbols in the table represent the following operations:

1a) Remove source from old source value holder in the target;

1b) Remove source from old source value holder vector in the target;

2a) Set the new target in the target value holder from the source;

a 2b) Add the new target to the target value holder vector from the source;

3a) Set the new source in the source value holder from the target;

3b) Add the new source to the source value holder vector from the target;

4a) Remove target from old target value holder in the source; and

4b) Remove target from old target value holder vector in the source.

TABLE 1

Steps Used for Each Object Association

| Step | 1 to 1 | 1 to Many | Many to 1 | Many to Many |
|---|---|---|---|---|
| 1 | 1a | 1b | N/A | N/A |
| 2 | 2a | 2b | 2a | 2b |
| 3 | 3a | 3a | 3b | 3b |
| 4 | 4a | N/A | 4b | N/A |

Figure 6A:
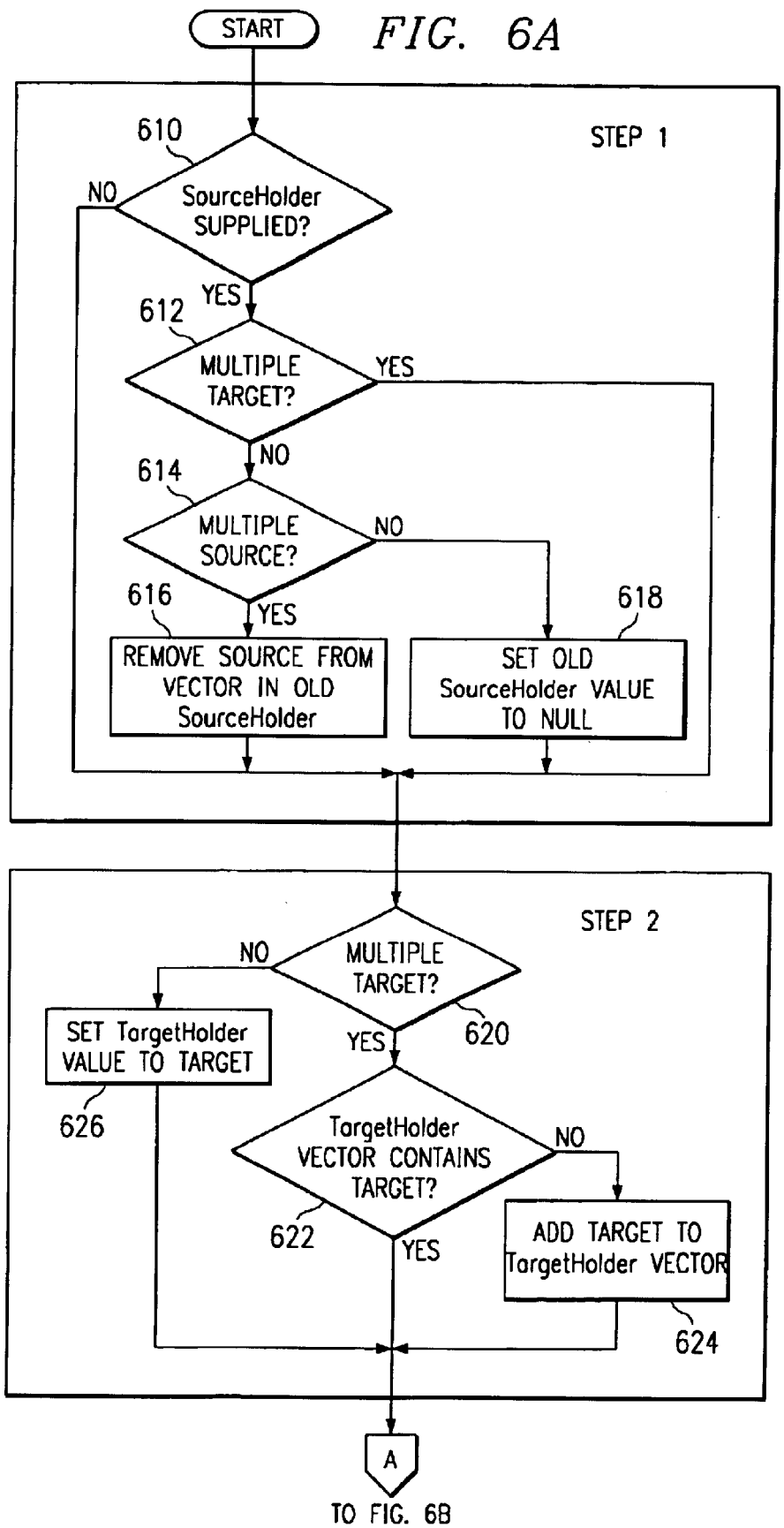
FIGS. 6A and 6B are related flowcharts outlining an exemplary operation of the present invention when adding an object association.
Figure 6B:
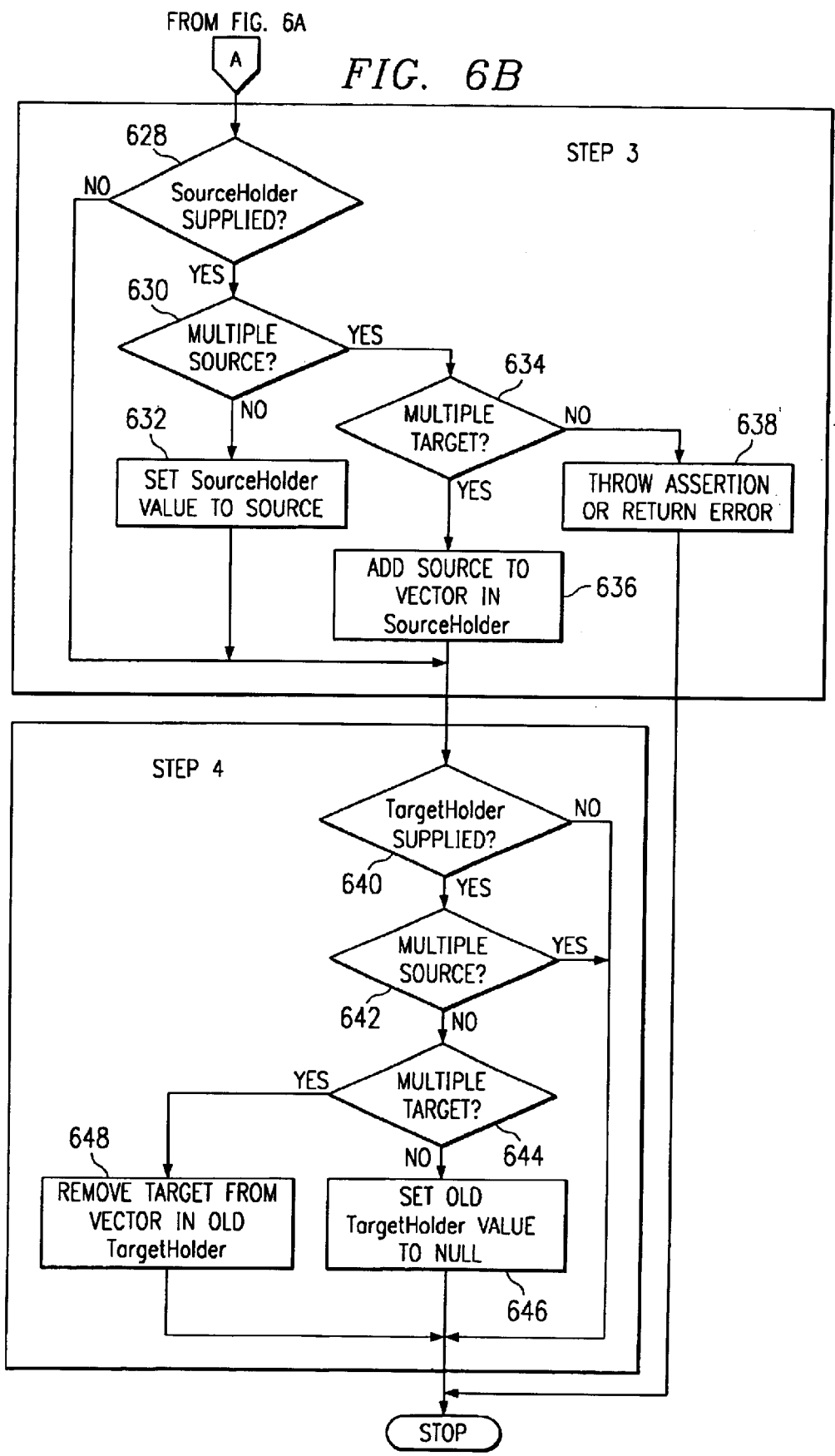

FIGS. 6A and 6B are related flowcharts outlining an exemplary operation of the present invention when creating or updating an object association. As shown in FIG. 6A, the operations starts, in step 1, with determining if a source value holder is supplied (step 610). If so, a determination is made as to whether there are multiple targets (step 612). If not, a determination is made as to whether or not there are multiple sources (step 614). If there are multiple sources, the Source (parameter 5) is removed from the vector in the old source value holder (step 616). If there are not multiple sources, the old sourceHolder value is set to null (step 618).

Thereafter, or if the source value holder is not supplied or if there are multiple targets, the operation continues to step 2. In step 2, a determination is made as to whether there are multiple targets (step 620). If there are multiple targets, a determination is made as to whether or not the target is in the target value holder vector (step 622). If not, the target is added to the target value holder vector (step 624). If there are no multiple targets in step 620, the target value holder value is set to the target (step 626).

Thereafter, the operation continues to step 3. In step 3, referring to FIG. 6B, a determination is made as to whether the source value holder is supplied (step 628). If so, a determination is made as to whether there are multiple sources (step 630). If there are not multiple sources, the source value holder value is set to the source (step 632). If there are multiple sources, a determination is made as to whether there are multiple targets (step 634). If there are multiple targets, the source is added to the vector in the source value holder (step 636). If there are not multiple targets, an exception is thrown or error code is returned and thereafter the operation ends (step 638).

There is the potential that a large vector of objects may need to be loaded from a data source such as a database before the new object can be added. This can be wasteful in terms of computing time and memory storage. This can be avoided by having the association in only one direction from the many side to the one side. The vector and the corresponding add and remove methods are removed from the class on the 1 side (class A in the examples above). The only method available now is the set method on the many side (method setA on class B). If a single directional association is used, the steps needed are reduced to simply setting the reference to class A in b2 to a1. A single directional association is indicated by not supplying the SourceHolder object to the addAssociation method; that is a null or some other "non-value" is used instead. In this case, the algorithm skips steps 1 and 3. If a single directional association is not implemented, then the use of the set method (setA) should be replaced by the add method (addB). Using the example above, the Java code b2.setA(a1) is replaced by its equivalent of a1.addB(b2).

Thereafter, the operation continues to step 4. In step 4, a determination is made as to whether a target value holder is supplied (step 640). If so, a determination is made as to whether there are multiple sources (step 642). If there are not multiple sources, a determination is made as to whether there are multiple targets (step 644). If there are not multiple targets, the old targetHolder value is set to null (step 646). If there are multiple targets, the target is removed from the vector in the old target value holder (step 648). Thereafter the operation ends.

In addition to the above method for creating or updating an object association, the present invention is capable of making use of a single method in common code to handle all cases of deleting an object association. The object association deletion method (referred to as deleteAssociation) is implemented in classes that contain an association to a many object, i.e. an object that is associated with many other objects in a class.

The deletion method uses the following six parameters of which the first is optional:

1) sourceHolder—the value holder that source currently points to;

2) targetHolder—the value holder that the target currently points to;

3) source—the source object instance;

4) target—the target object instance;

5) sourceCardinality—false if the cardinality of the source is 1, true if it is many; and 6) targetCardinality—false if the cardinality of the target is 1, true if it is many.

In the case of a one to many object association, for example, the values of the parameters would be as follows:

1) sourceHolder=a1 value holder;

2) targetHolder=b1 value holder;

3) source=a1;

4) target=b1;

5) sourceCardinality=false; and 6) targetCardinality=true.

Taking the six parameters described above, a single method may be used to perform deletion of object associations as described above. As an example, if an object association in a one to many object association is to be deleted, the implementation of the method is as follows:

1) sourceHolder.setValue(null)—sets the reference to A in b1 to null; and
2) targetHolder.getValue( ).removeElement(b1)— removes the element b1 from the vector in class A.

The generalized method has two steps and the first step has two variations depending on the cardinality of the object. The steps are:

1) update the source (either set the value to null—1a or remove the source element from the source vector in the target—1b) and
2) update the target, i.e. remove the target element from the target vector in the source.

Table 2 summarizes the steps used to delete an object association.

TABLE 2

Steps Used for Deletion of an Object Association

| Step | 1 to Many | Many to Many |
|------|-----------|--------------|
| 1    | 1a        | 1b           |
| 2    | 2         | 2            |

Figure 7:
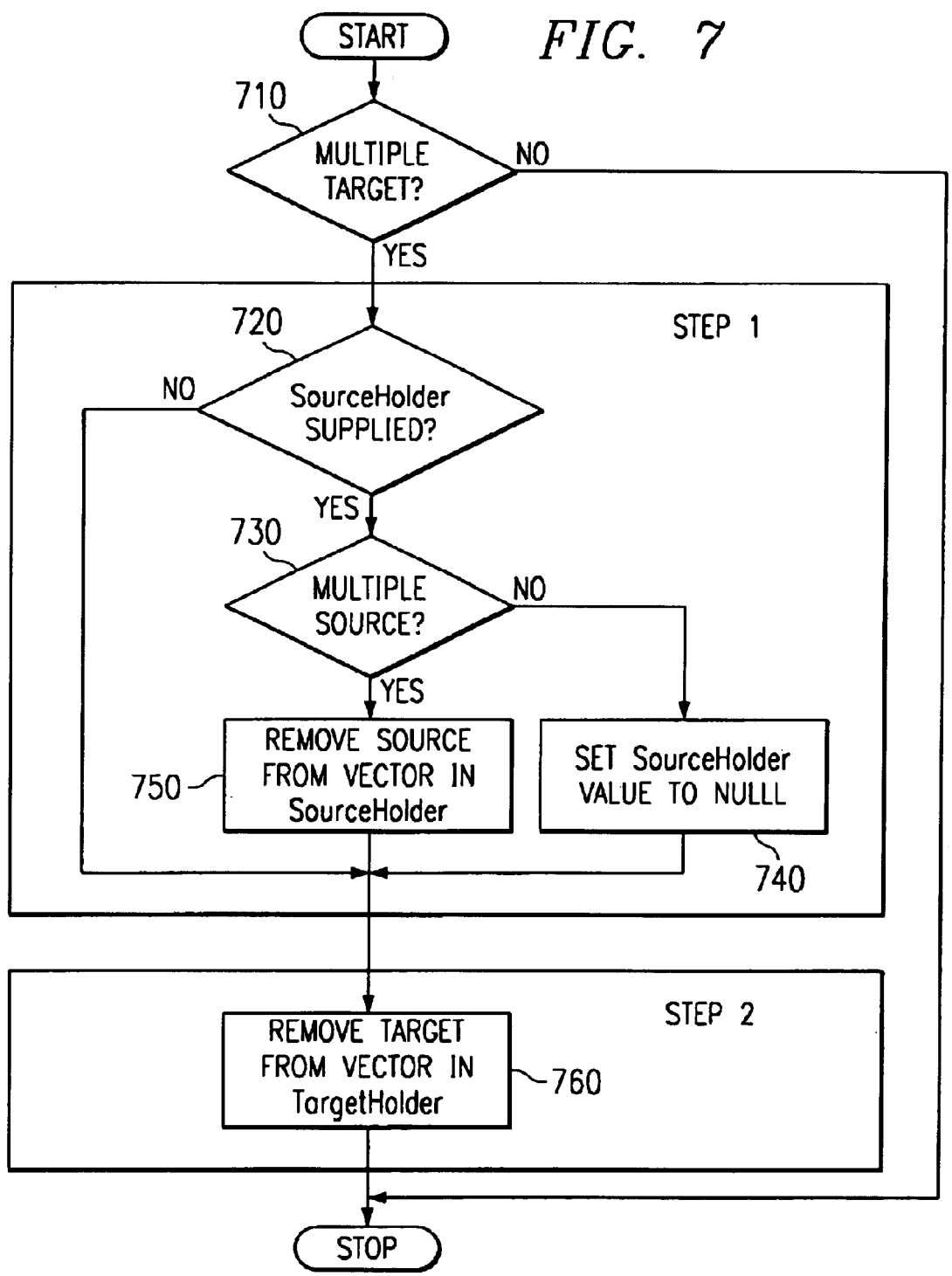
FIG. 7 is a flowchart outlining an exemplary operation of the present invention when removing an object association.

FIG. 7 is a flowchart outlining an exemplary operation of the present invention when deleting an object association. As shown in FIG. 7, the operation starts with a determination as to whether there are multiple targets (step 710). If there are multiple targets, the operation continues to step 1; otherwise, the operation ends.

In step 1 if there are multiple targets, a determination is made as to whether a source value holder is supplied (step 720). If a source value holder is supplied, a determination is made as to whether there are multiple sources (step 730). If there are not multiple sources, the sourceHolder value is set to null (step 740). If there are multiple sources, the source is removed from the vector in the source value holder (step 750).

Thereafter, the operation continues to step 2. In step 2, the target is removed from the vector in the target value holder (step 760). The operation then ends.

One of ordinary skill in the art will recognize that there are many different ways in which the algorithms described above may be implemented. The present invention is intended to encompass all possible implementations of the above algorithms. However, two minor implementation details that may be helpful are:

1) In addAssociation, in order to maintain object uniqueness, an object should only be added to the vector if it does not already exist in the vector; and
2) The implementation of the add or set methods that call the addAssociation method should ensure that the appropriate holders are passed in. Depending on existing associations the old holders may not exist. Therefore care is needed when determining the parameters passed to addAssociation.

The present invention provides a single method for creating or updating each of the possible combinations of object associations. Because a single method is capable of performing the creation or updating of a plurality of different combinations of object associations, rather than multiple methods or algorithms, the complexity of the code necessary to perform these functions is reduced.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of updating an object association between a source object and a target object, comprising:

updating a target value holder of the target object with a new source to identify the source object, wherein the target value holder is an object that wrappers an instance of the source object in order to implement a proxy pattern; and updating a source value holder of the source object with a new target to identify the target object, wherein the source value holder is an object that wrappers an instance of the target object in order to implement a proxy pattern;

wherein if the object association is a one to one object association, the step of updating the target value holder includes:

setting the new target in the target value holder from the source object, and removing a target from an old target value holder in the source object, if the old target value holder already contains the target; and the step of updating the source value holder includes:

removing a source from an old source value holder in the target object, if the old source value holder already contains the source; and setting the new source in the source value holder from the target object.

2. The method of claim 1, wherein if the object association is a one to many object association, the step of updating the target value holder includes:

adding the new target to the target value holder from the source object, if the target value holder does not already contain the new target;

and the step of updating the source value holder includes:

removing a source from an old source value holder in the target object, if the old source value holder already contains the source; and setting the new source in the source value holder from the target object.

3. The method in claim 1, wherein if the object association is a many to one object association, the step of updating the target value holder includes:

setting the new target in the target value holder from the source object, and removing a target from an old target value holder in the source, if the old target value holder already contains the target;

and the step of updating the source value holder includes:
   adding the new source to the source value holder from the target, if the source value holder does not already contain the new source.

4. The method in claim 1, wherein if the object association is a many to many object association, the step of updating the target value holder includes:
   adding the new target to the target value holder from the source object, if the target value holder does not already contain the new target;
   and the step of updating the source value holder includes:
      adding the new source to the source value holder from the target object, if the source value holder does not already contain the new source.

5. The method in claim 1, wherein the target value holder includes a method for setting a source object to be wrapped by the target value holder, and a method for returning a target object wrapped by the source value holder; and
   wherein the source value holder includes a method for setting a target object to be wrapped by the source value holder, and a method for returning a source object wrapped by the target value holder.

6. The method in claim 1, wherein the steps of updating a target object is performed using a source value holder implemented in Java, C++, Smalltalk, Eiffel, or other object oriented language; and
   wherein the steps of updating a source object is performed using a target value holder implemented in Java, C++, Smalltalk, Eiffel, or other object oriented language.

7. The method in claim 1, wherein the target value holder receives as input parameters one or more of:
   a value holder that an old source currently points to;
   a value holder that an old target currently points to;
   a value holder that a source currently points to;
   a value holder that a target currently points to;
   a source value;
   a target value;
   a source cardinality; and
   a target cardinality; and
wherein the source value holder receives as input parameters one or more of:
   a value holder that an old source currently points to;
   a value holder that an old target currently points to;
   a value holder that a source currently points to;
   a value holder that a target currently points to;
   a source value;
   a target value;
   a source cardinality; and
   a target cardinality.

8. A method of deleting an object association between a source object and a target object, comprising:
   updating a source value holder of the source object to identify the target object, wherein the source value holder is an object that wrappers an instance of the target object in order to implement a proxy pattern; and
   updating a target value holder of the target object to identify the source object,
   wherein the target value holder is an object that wrappers an instance of the source object in order to implement a proxy pattern;
   wherein if the object association is a one to many object association, the step of updating the source value holder includes:
      setting a value in the source value holder to null;
   and the step of updating the target value holder includes:
      removing a target from an the target value holder in the source object, if the target value holder already contains the target.

9. The method of claim 8, wherein if the object association is a many to many object association, the step of updating the source value holder includes:
   removing a source from the source value holder in the target object, if the source value holder already contains the source;
   and the step of updating the target value holder includes:
      removing a target from the target value holder in the source object, if the target value holder already contains the target.

10. The method of claim 8, wherein the target value holder includes a method for setting a source object to be wrapped by the target value holder, and a method for returning a target object wrapped by the source value holder; and
   wherein by the source value holder includes a method for setting a target object to be wrapped by the source value holder, and a method for returning a source object wrapped by the target value holder.

11. The method of claim 8, wherein the steps of updating a target object is performed using a source value holder implemented in Java, C++, Smalltalk, Eiffel, or other object oriented language; and
   wherein the steps of updating a source object is performed using a target value holder implemented in Java, C++, Smalltalk, Eiffel, or other object oriented language.

12. The method of claim 8, wherein the target value holder receives as input parameters one or more of:
   a value holder that a source currently points to;
   a value holder that a target currently points to;
   a source value;
   a target value;
   a source cardinality; and
   a target cardinality; and
wherein the source value holder receives as input parameters one or more of:
   a value holder that a source currently points to;
   a value holder that a target currently points to;
   a source value;
   a source cardinality; and
   a target cardinality.

13. A computer program product in a computer readable medium for updating an object association between a source object and a target object, comprising:
   first instructions for updating a target value holder of the target object with a new source to identify the source object, wherein the target value holder is an object that wrappers an instance of the source object in order to implement a proxy pattern; and
   second instructions for updating a source value holder of the source object with a new target to identify the target object, wherein the source value holder is an object that wrappers an instance of the target object in order to implement a proxy pattern;
   wherein if the object association is a one to one object association, the step of updating the target value holder includes:
      setting the new target in the target value holder from the source object, and removing a target from an old target value holder in the source object, if the old target value holder already contains the target;

and the step of updating the source value holder includes:

removing a source from an old source value holder in the target object, if the old source value holder already contains the source; and setting the new source in the source value holder from the target object.

14. The computer program product of claim 13, wherein if the object association is a one to many object association, the first instructions for updating the target value holder includes:

adding the new target to the target value holder from the source object, if the target value holder does not already contain the target;

and the second instructions for updating the source value holder includes:

removing a source from an old source value holder in the target object, if the old source value holder already contains the source; and setting the new source in the source value holder from the target object.

15. The computer program product in claim 13, wherein if the object association is a many to one object association, the first instructions for updating the target value holder includes:

setting the new target in the target value holder from the source object, and removing a target from an old target value holder in the source, if the old target value holder already contains the target;

and the second instructions for updating the source value holder includes:

adding the new source to the source value holder from the target, if the source value holder does not already contain the new source.

16. The computer program product in claim 13, wherein if the object association is a many to many object association, the first instructions for updating the target value holder includes:

adding the new target to the target value holder from the source object, if the target value holder does not already contain the new target;

and the second instructions for updating the source value holder includes:

adding the new source to the source value holder collection from the target object, if the source value holder does not already contain the new source.

17. The computer program product of claim 13, wherein the target value holder includes instructions for setting a source object to be wrapped by the target value holder, and instructions for returning a target object wrapped by the source value holder; and wherein the source value holder includes instructions for setting a target object to be wrapped by the source value holder and instructions for returning a source object wrapped by the target value holder.

18. The computer program product in claim 13, wherein the first instructions for updating a target object is performed using a source value holder implemented in Java, C++, Smalltalk, Eiffel, or other object oriented language; and wherein the second instructions for updating a source object is performed using a target value holder implemented in Java, C++, Smalltalk, Eiffel, or other object oriented language.

19. The computer program product in claim 13, wherein the target value holder receives as input parameters one or more of:

a value holder that an old source currently points to;

a value holder that an old target currently points to;

a value holder that a source currently points to;

a value holder that a target currently points to;

a source value;

a target value;

a source cardinality; and a target cardinality; and wherein the source value holder receives as input parameters one or more of:

a value holder that an old source currently points to;

a value holder that an old target currently points to;

a value holder that a source currently points to;

a value holder that a target currently faints to;

a source value;

a target value;

a source cardinality; and a target cardinality.

20. A computer program product in a computer readable medium for deleting an object association between a source object and a target object, comprising:

first instructions for updating a source value holder of the source object to identify the target object, wherein the source value holder is an object that wrappers an instance of the target object in order to implement a proxy pattern; and second instructions for updating a target value holder of the target object to identify the source object, wherein the target value holder is an object that wrappers an instance of the source object in order to implement a proxy pattern;

wherein if the object association is a one to many object association, the step of updating the source value holder includes:

setting a value in the source value holder to null;

and the step of updating the target value holder includes:

removing a target from an the target value holder in the source object, if the target value holder already contains the target.

21. The computer program product of claim 20, wherein if the object association is a many to many object association, the first instructions for updating the source value holder includes:

removing a source from the source value holder in the target, if the source value holder already contains the source;

and the second instructions for updating the target value holder includes:

removing a target from the target value holder in the source object, if the target value holder already contains the target.

22. The computer program product of claim 20, wherein the target value holder includes instructions for setting a source to be wrapped by the target value holder, and instructions for returning a target object wrapped by the source value holder; and wherein the source value holder includes instructions for setting a target object to be wrapped by the source value holder, and instructions for returning a source object wrapped by the target value holder.

23. The computer program product of claim 20, wherein the first instructions for updating a source object is performed using a target value holder implemented in Java, C++, Smalltalk, Eiffel, or other object oriented language; and wherein the second instructions for updating a target object is performed using a source value holder implemented in Java, C++, Smalltalk, Eiffel, or other object oriented language.

24. The computer program product of claim 20, wherein the target value holder receives as input parameters one or more of:

a value holder that a source currently points to;

a value holder that a target currently points to;

a source value;

a target value;

a source cardinality; and a target cardinality; and wherein the source value holder receives as input parameters one or more of:

a value holder that a source currently points to;

a value holder that a target currently points to;

a source value;

a target value;

a source cardinality; and a target cardinality.

25. An apparatus for updating an object association between a source object and a target object, comprising:

means for updating a target value holder of the target object with a new source to identify the source object, wherein the target value holder is an object that wrappers an instance of the source object in order to implement a proxy pattern; and means for updating a source value holder of the source object with a new target to identify the target object, wherein the source value holder is an object that wrappers an instance of the target object in order to implement a proxy pattern;

wherein if the object association is a one to one object association, the step of updating the target value holder includes:

setting the new target in the target value holder from the source object, and removing a target from an old target value holder in the source object, if the old target value holder already contains the target; and the step of updating the source value holder includes:

removing a source from an old source value holder in the target object, if the old source value holder already contains the source; and setting the new source in the source value holder from the target object.

26. An apparatus for deleting an object association between a source object and a target object, comprising:

means for updating a source value holder of the source object to identify the target object, wherein the source value holder is an object that wrappers an instance of the target object in order to implement a proxy pattern; and means for updating a target value holder of the target object to identify the source object, wherein the target value holder is an object that wrappers an instance of the source object in order to implement a proxy pattern;

wherein if the object association is a one to many object association, the step of updating the source value holder includes:

setting a value in the source value holder to null;

and the step of updating the target value holder includes:

removing a target from an the target value holder in the source object, if the target value holder already contains the target.

* * * * *

UNITED STATES PATENT AND TRADEMARK OFFICE
CERTIFICATE OF CORRECTION

PATENT NO. : 6,877,159 B1
APPLICATION NO. : 09/627177
DATED : April 5, 2005
INVENTOR(S) : Nielsen et al.

Page 1 of 1

It is certified that error appears in the above-identified patent and that said Letters Patent is hereby corrected as shown below:

Col. 7, line 15: before "2b)" delete "a".

Col. 12, line 22: after "wherein" delete "by".

Col. 12, after line 45 insert a return and the following line:
   --a target value;--.

Col. 13, line 17: after "contain the" insert --new--.

Col. 13, line 49: before "from the" delete "collection".

Col. 14, line 17: after "currently" delete "faints" and insert --points--.

Signed and Sealed this

First Day of August, 2006

JON W. DUDAS
*Director of the United States Patent and Trademark Office*